US010307663B1

United States Patent
Bates

(10) Patent No.: US 10,307,663 B1
(45) Date of Patent: Jun. 4, 2019

(54) CUE SPORT SOCCER GAME

(71) Applicant: Richard Dally Bates, Lakeland, FL (US)

(72) Inventor: Richard Dally Bates, Lakeland, FL (US)

( * ) Notice: Subject to any disclaimer, the term of this patent is extended or adjusted under 35 U.S.C. 154(b) by 20 days.

(21) Appl. No.: 15/294,775

(22) Filed: Oct. 16, 2016

Related U.S. Application Data

(60) Provisional application No. 62/242,578, filed on Oct. 16, 2015.

(51) Int. Cl.
| | |
|---|---|
| *A63F 13/812* | (2014.01) |
| *A63F 7/00* | (2006.01) |
| *A63D 15/08* | (2006.01) |
| *A63D 15/00* | (2006.01) |
| *A63F 13/843* | (2014.01) |
| *A63F 7/06* | (2006.01) |

(52) U.S. Cl.
CPC ............ *A63F 7/0023* (2013.01); *A63D 15/00* (2013.01); *A63D 15/08* (2013.01); *A63F 7/0076* (2013.01); *A63F 7/0616* (2013.01); *A63F 13/812* (2014.09); *A63F 13/843* (2014.09); *A63F 2300/8011* (2013.01)

(58) Field of Classification Search
CPC .... A63F 7/0023; A63F 13/812; A63F 13/843; A63D 15/00
USPC .......................................................... 463/2
See application file for complete search history.

(56) References Cited

U.S. PATENT DOCUMENTS

| | | | |
|---|---|---|---|
| 4,055,343 A | 10/1977 | Stuart | |
| 4,063,728 A * | 12/1977 | Zemanek | A63D 15/04 |
| | | | 273/108.1 |
| 4,201,383 A | 5/1980 | Schaller | |
| 4,555,114 A | 11/1985 | Dozier | |
| 4,585,235 A | 4/1986 | Williams | |
| 4,790,534 A | 12/1988 | Jamison | |
| 4,875,680 A | 10/1989 | Gross | |
| 5,029,861 A | 7/1991 | Driska | |
| 5,372,364 A * | 12/1994 | Arroyo | A63F 7/0668 |
| | | | 273/108.5 |
| 5,423,537 A * | 6/1995 | Santana | A63F 7/0668 |
| | | | 273/108.5 |
| 6,561,511 B1 * | 5/2003 | Vaysberg | A63F 7/068 |
| | | | 273/108.56 |
| 6,780,117 B1 | 8/2004 | Osborne | |
| 7,204,487 B1 * | 4/2007 | Pohl | A63F 7/06 |
| | | | 273/108.1 |
| 8,925,922 B2 * | 1/2015 | Nwanna | A63F 7/06 |
| | | | 273/108.1 |
| 2001/0055993 A1 * | 12/2001 | Diamant | A63D 15/04 |
| | | | 473/10 |

(Continued)

*Primary Examiner* — Jay Trent Liddle
*Assistant Examiner* — Ryan Hsu
(74) *Attorney, Agent, or Firm* — H. John Rizvi; John Rizvi, P.A.

(57) ABSTRACT

A cue sport soccer game is disclosed including a playing surface, a first goal, a second goal, and playing pieces. The cue sport soccer game includes one or more indicator objects and/or one or more move indicators. The cue sport soccer game is to be played with a cue stick. The playing pieces include field pieces that are configured to slide on the playing surface strategically when struck by the cue stick. The field pieces may be struck strategically lightly or heavily to cause a game ball to be trajected in a grounded fashion or an elevated fashion respectively.

11 Claims, 6 Drawing Sheets

(56) References Cited

U.S. PATENT DOCUMENTS

| | | | |
|---|---|---|---|
| 2002/0096826 A1* | 7/2002 | Bisbee | A63F 7/06 273/108.56 |
| 2005/0035548 A1* | 2/2005 | Yoseloff | G07F 17/32 273/274 |
| 2007/0075487 A1 | 4/2007 | Silva | |
| 2012/0235353 A1* | 9/2012 | Chambless, III | A63D 15/04 273/126 R |
| 2016/0107077 A1* | 4/2016 | Kuroiwa | A63F 7/0616 273/108.56 |

* cited by examiner

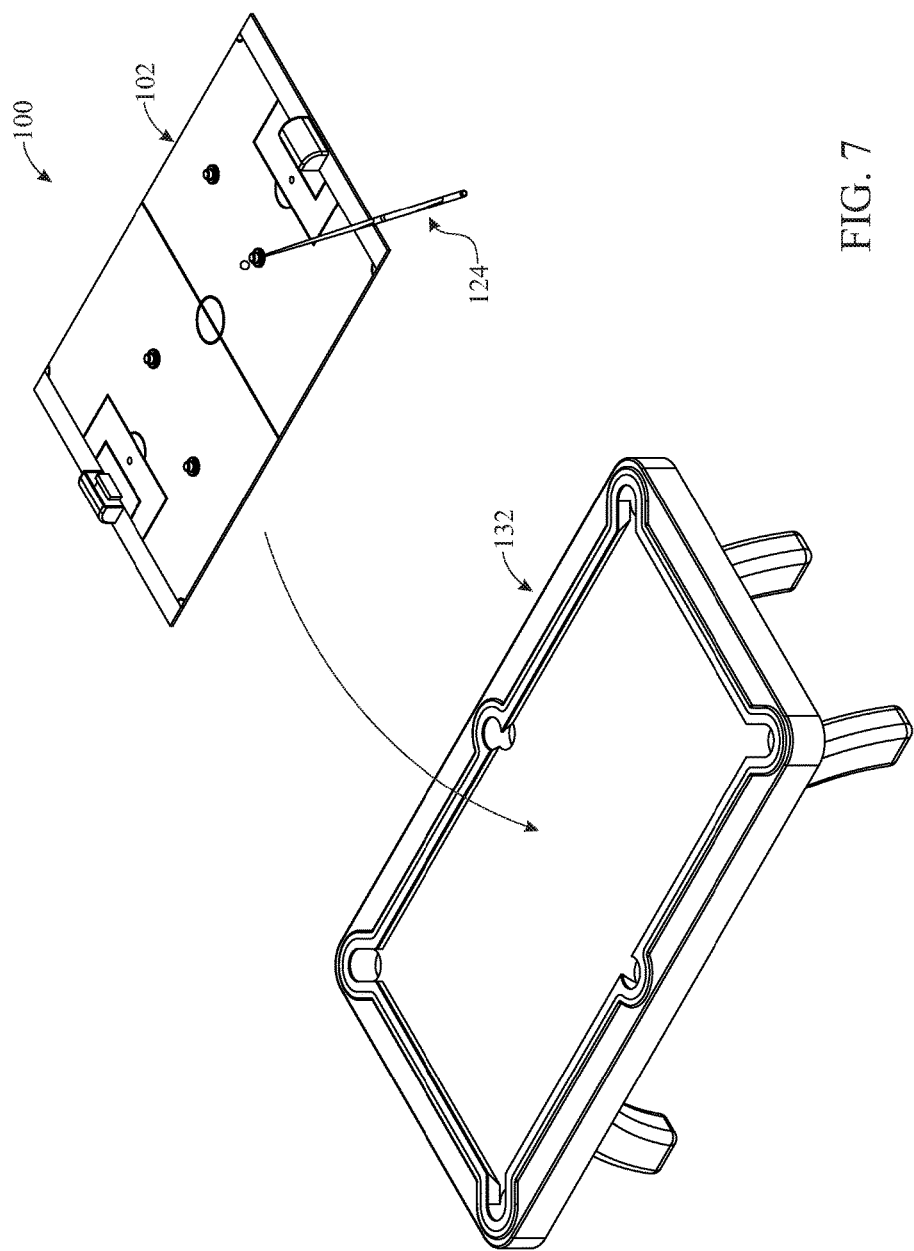

CUE SPORT SOCCER GAME

CROSS-REFERENCE TO RELATED APPLICATION

This application claims the benefit of U.S. Provisional Patent Application Ser. No. 62/242,578, filed Oct. 16, 2015, which is incorporated herein in its entirety.

FIELD OF THE INVENTION

The present invention relates generally to cue sport games, and more particularly, to a cue sport soccer game.

BACKGROUND OF THE INVENTION

Table games that represent other popular games are enjoyed by many around the world. Soccer is one of the most popular sports in the world, and as such, soccer is commonly represented via a table game. For example, button soccer (also known as button football or "Futebol de Mesa") is a soccer representing table game popular in Brazil and Hungary, as well as other countries in Europe. Subbuteo is a group of table top games representing team sports, most popularly soccer. For example, button soccer and Subbuteo both involve scoring a goal by flicking or moving pieces representing field positions.

Particularly, in button soccer, small disks representing field positions are moved by applying a downward force via a small finger-held disk, the finger-held disk approximately having a same size as the field position disks. Upon being subjected to an appropriate downward force, the field position disks propel forward to strike a game ball for passing, dribbling or ultimately for scoring a goal. A goal is guarded by a goalie block, which an offensive player must bypass in a shot to score a goal. In the example of Subbuteo, field position pieces are moved via a player's finger, by finger flicking for example. These common soccer representing table top games usually include or are based on typical rules of soccer.

Cue sports (i.e. billiards or billiard type games), are very popular throughout the world. Cue sports such as pocket billiards (otherwise known as pool), provide an exciting table top, turn-based strategic game requiring great skill, finesse, and strategy to beat or outsmart an opponent. For example, a skilled billiards player generally strategically plans the trajectory and placement of a cue ball after striking the cue ball to score a point or sink a target ball. Many enjoy the feeling of striking a cue ball with a cue stick, which provides unique control over ball trajectories before and after impact. For example, in billiards, angles and trajectories of balls can be controlled with finesse to beat or outsmart an opponent. As another example, a cue ball may be struck in particular ways to provide spin (i.e. english).

Table top soccer games will benefit from the advancement of including various cue sport configurations and rules. There are existing patents that disclose billiards games played on tables including soccer-representing figurines, however these patents are limited to directly striking a ball with a cue stick, and lack the strategy and feel of billiards. For example, the feeling of striking a cue object to cause another object to travel into a target is missing from these patents. Therefore, there exists a market and desire for a table top game that uniquely incorporates elements of cue sports and table top soccer games in a novel and useful manner to provide a strategic feel of billiards while representing soccer.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure a cue sport soccer game is disclosed, comprising, a playing surface, two goals placed at opposite ends of the playing surface, a ball;

field pieces, the field pieces configured to be struck by a cue stick such that the field pieces slide on the playing surface for impacting the ball, and the ball being configured to be trajected forward in response to being impacted by a field piece of the field pieces.

In another aspect, the game further comprises a foul indicator object to indicate when a field piece is struck as a foul.

In another aspect, the field pieces include a turn indicator that is configured to indicate a number of turns for the field pieces.

In another aspect, the field pieces have a first and second tier that each have different diameters.

In another aspect, the field pieces have a first and second tier that each have different thicknesses.

In another aspect, the field pieces are configured to traject the ball in a grounded or elevated fashion in response to a light or heavy impact, respectively.

In another aspect, the field pieces have a two tier structure including a first tier and a second tier, where the first tier has a greater diameter than the second tier and the second tier has a greater thickness than the first tier.

In another aspect, the field pieces have a two tier structure including a first tier and a second tier, where the first tier and the second tier are cylindrical in shape.

In another aspect, the field pieces are strikeable by a cue stick to cause the field pieces to slide on the playing surface like a puck.

Disclosed is a method for playing a cue sport soccer game on a playing surface, the method comprising, an offense team striking an offense field piece to subsequently traject a ball to an opposite side of the playing surface, a defense team striking a defense field piece for blocking the offense team from scoring a goal, and each defense field piece having a limited number of defensive positioning moves, and each offense piece having a limited number of offensive positioning moves.

In another aspect, the method is provided via a computer system as a video game.

In another aspect, the playing surface is configured to fit on a billiards table.

Further disclosed is a method for playing a cue sport soccer game on a playing surface, the method comprising, providing a cue sport soccer game set up, the game set up including, a playing surface, two goals placed at opposite ends of the playing surface, a ball, field pieces, the field pieces configured to be struck by a cue stick such that the field pieces slide on the playing surface for impacting the ball, and the ball being configured to be trajected forward in response to being impacted by a field piece of the field pieces, in an offensive turn, an offense team striking an offense field piece to subsequently traject a ball to a target goal, and if a goal is not scored, in a defensive turn, a defense team striking a defense field piece for blocking the offense team from scoring a goal in a next offensive turn of the offense team.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

FIG. 7 presents a perspective view of elements of the cue sport soccer game being placed on a billiards table.

It is to be understood that like reference numerals refer to like parts throughout the several views of the drawings.

DETAILED DESCRIPTION

Figure 1:
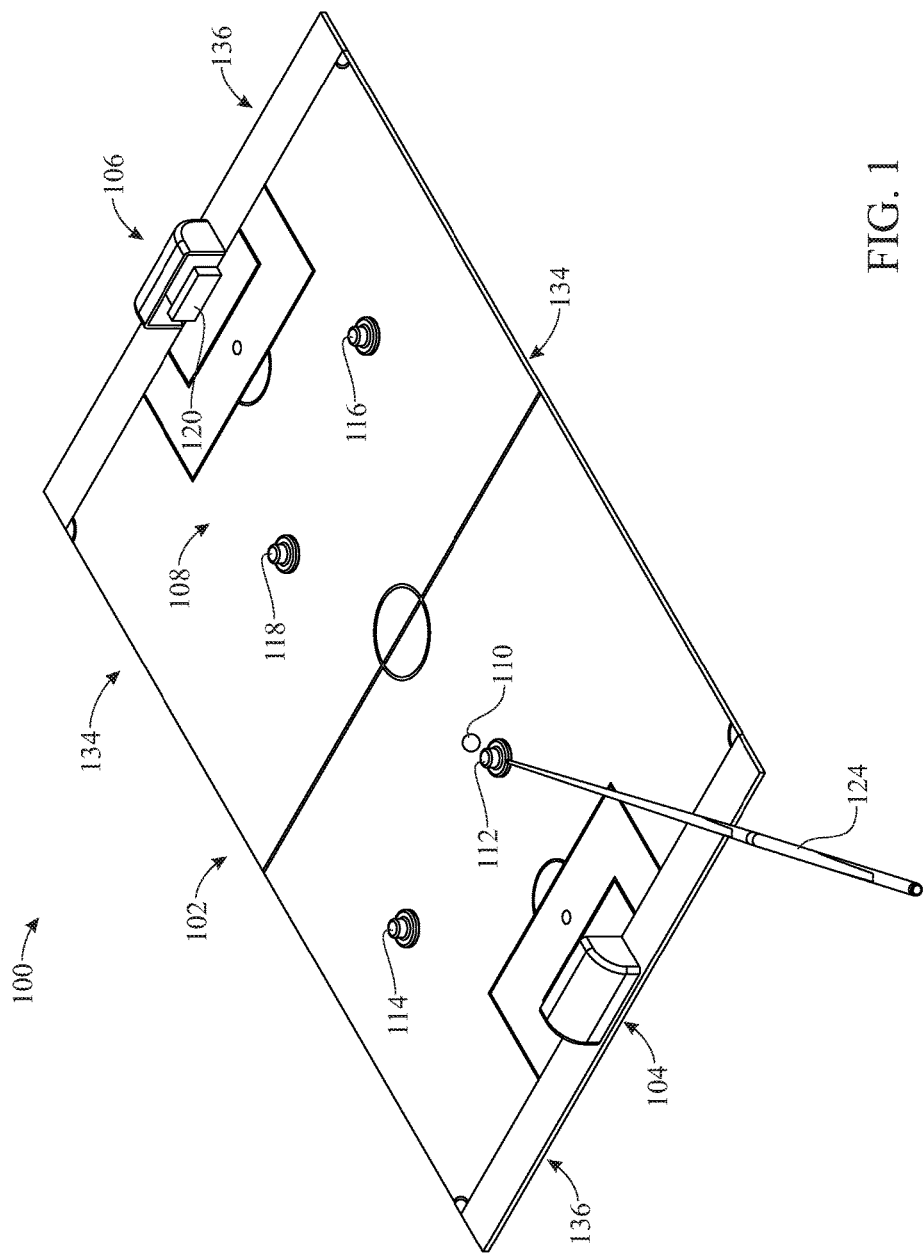
FIG. 1 presents a top perspective view of a cue sport soccer game at a first gameplay instance, in accordance with aspects of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure; which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification; are simply exemplary embodiments of the inventive concepts defined in the appended claims. Hence, specific dimensions and other physical characteristics relating to the embodiments disclosed herein are not to be considered as limiting, unless the claims expressly state otherwise.

The illustrations of FIGS. 1-3, and FIG. 7 present a cue sport soccer game 100 including a playing surface 102, a first goal 104, a second goal 106, and playing pieces 108. The playing pieces 108 include a first field piece 112, a second field piece 114, a third field piece 116, a fourth field piece 118, a ball 110, a first goalie (not shown), and a second goalie 120. The cue sport soccer game 100 (game set up) includes one or more indicator objects such as indicator object 122 (FIGS. 2, 3, and 4) and/or one or more move indicators such as move indicator 126 (FIG. 5) to indicate a number of moves left for a field piece. The indicator object 122 may indicate that a field piece has no more moves, or indicate that a foul has occurred (e.g. when the indicator object 122 falls off a field piece). The cue sport soccer game 100 is to be played with one or more cue sticks, such as cue stick 124 shown in FIGS. 1-3 and FIG. 7. The cue sport soccer game 100 may be provided to a user or player via a physical apparatus or a computer implemented method, program or video game or other interactive media, and may be played or provided via or with a set of rules, as further described below. In some embodiments, the cue sport soccer game 100 may be provided in the form of a physical kit, including one or a plurality of elements described herein.

As shown in FIGS. 1-3 and 7, the playing surface 102 includes or displays various field lines known to soccer, as shown in FIG. 1, such as a half way line, penalty boxes (18 yard boxes), 6-yard boxes, penalty spots, corner kick lines (marks), a center (kickoff) spot, a center circle, field boundary lines (e.g. for determining out-of-bounds scenarios or a goal kick, corner, or a throw-in, etc.). The playing surface may be divided substantially in half by the half way line, and each half may include one penalty box, one 6-yard box, one penalty spot, and two corner kick lines. Such field boundary lines may include side lines (touch lines) or end lines (goal lines). The field lines may be proportional to real soccer field lines, or alternatively may have any appropriate configuration for gameplay or aesthetic purposes. For example, the goals may each be provided on an end line.

The playing surface 102 may be formed by or may include various materials such as felt, fabric or artificial turf as per table soccer or billiards. For example, the playing surface 102 may include a surface of a sheet of any appropriate material which may be rolled or folded for storage, transport, or packaging. When configured or initialized for gameplay, the playing surface 102 is generally or consistently flat from end to end to provide even and fair gameplay. The playing surface 102 may be attached or adhered to a rigid planar structure that includes materials such as particle board, wood, metal, plastic, rubber, cardboard etc., or a combination thereof, to support the playing surface 102.

The playing surface 102 and/or playing pieces 108 may be configured to allow pieces to glide or slide over the playing surface 102 appropriately or as desired by a game designer, and may thus be configured to have a specific coefficient of friction (e.g. static or kinetic friction or an appropriate drag coefficient), with respect to gliding or sliding playing pieces, such as some or all of playing pieces 108 (e.g. the field pieces, goalies or ball). The playing pieces 108 are further described in more detail below.

The playing surface 102 may be raised or located 30 to 40 inches off the ground, or may be raised to a typical height of a billiards table. However, it is to be understood that the playing surface 102 may be raised to any appropriate height for comfort, convenience or performance without departing from scope of the disclosure. In some embodiments, as shown in FIG. 7, the playing surface 102 may be provided or placed on a typical billiards table 132. For example, the playing surface 102 may be configured to fit within rails or cushions (i.e. bumpers) of a billiards table (e.g. spanning a playing slate or playing field of a billiards table). In some embodiments, the playing surface 102 may be provided or placed on, or supported by tops of the rails or cushions of a billiards table. The playing surface 102 may be provided on, or supported by a table, or any appropriate support that can withstand a person leaning on the supported playing surface 102 and the support while taking a shot with a cue stick. For example, in some instances the playing surface 102 may be supported by saw horses.

The playing surface 102 may have any appropriate dimension. For example, the playing surface may have a substantially rectangular area spanning 4 feet (121.9 cm) by 8 feet (243.8 cm), or may have dimensions congruent or according to typical billiards tables. In some embodiments, the playing surface 102 has dimensions proportional to a real soccer field and the field lines may be proportional to actual soccer field lines with respect to the playing surface 102 dimensions. For example, the playing surface 102 may appear to be a miniature or small scale soccer field. The playing surface 102 may terminate (at terminal sides) at one or more of the field boundary lines, or may include additional substantially co-planar surface around a perimeter of the field boundary lines (i.e. the side lines and the end lines) before terminating, FIG. 1 shows such terminal sides as terminal longer sides 134 and terminal shorter sides 136. The terminal longer sides 134 are along a length of the playing surface 102, along the side lines (otherwise known as touch lines in soccer). On the other hand, terminal shorter sides 136 are along a width of the playing surface 102, along the end lines (goal lines), Such terminal sides may define the playing surface 102. The terminal longer sides 134 and terminal shorter sides 136 may be perpendicular to one another while being co-planar with the playing surface 102. In alternative embodiments, it is to be understood that the lengths of the terminal sides may produce a square playing surface 102. Further, the length of any of the terminal sides is not limited to being proportional to a soccer field as described above, or may not be limited to fit on or within a billiards table, and may take any appropriate length or scale. The above described additional or extending co-planar surface around the perimeter of the field boundary lines may be considered herein as an extension of the playing surface 102 around the side lines and/or the end lines, to provide ergonomics or to appear more like a soccer field having a warm-up track around the field's perimeter. For example, such additional surface may extend between the field boundary lines and the above described terminal sides, and may have dampening configurations as further described below.

In some embodiments, the playing surface 102, or more particularly the terminal sides may include laterally raised structures (extending upward from the playing surface) or walls on, at, or near one or more field boundaries of the playing surface 102 or at one or more of the terminal ends or sides of the playing surface. For example, the walls may be configured to keep the playing pieces 108 from sliding or falling off the playing surface 102. Such raised sides may include materials, structures or structural dampening configurations to dampen the impact of the playing pieces 108 contacting the sides. For example, such dampening may be configured to stop playing pieces 108 from sliding back into the playing surface ?? and interfering with objects within the field boundary lines after contacting the sides (i.e. an area defined by the side lines intersecting with the end lines). For example, the sides or walls and/or the playing pieces 108 may include hook and loop fasteners such as VELCRO® or magnetic components or materials to grab and/or hold playing pieces 108 contacting the sides. As another example, the playing surface 102 may include substantially co-planar surfaces around a perimeter and between field boundary lines (i.e. throw-in lines or field-end lines) and the sides (e.g. raised sides, walls, or the terminal sides) to slow down or stop playing pieces 108, such as rubber, high-friction paper, crumpled paper, dry loose beans or pebbles, etc. Further, the raised sides may include ergonomic contours or configurations to provide comfort to a user resting their hand on the raised sides while utilizing a billiards cue (e.g. cue stick 124) to strike field pieces, similar to rails or cushions (e.g. bumpers) of a billiards table. The terminal sides or boundaries of the playing surface 102 may include dips or slots to receive and hold playing pieces 108 that exit the bounds of the playing surface 102, or the field boundary lines.

The playing pieces 108 will now be further described. The first field piece 112, second field piece 114, third field piece 116, and fourth field piece 118 are generally referred to herein as "field pieces". The first goalie and the second goalie 120 are generally referred to herein as "goalies". The first goalie is not visible in FIGS. 1-3, since visibility of the first goalie is blocked by the first goal 104. However, it is to be understood that two goalies may be included in the cue sport soccer game 100 each positioned near each goal for blocking shots made to the goals (via static or dynamic goaltending).

Figure 2:
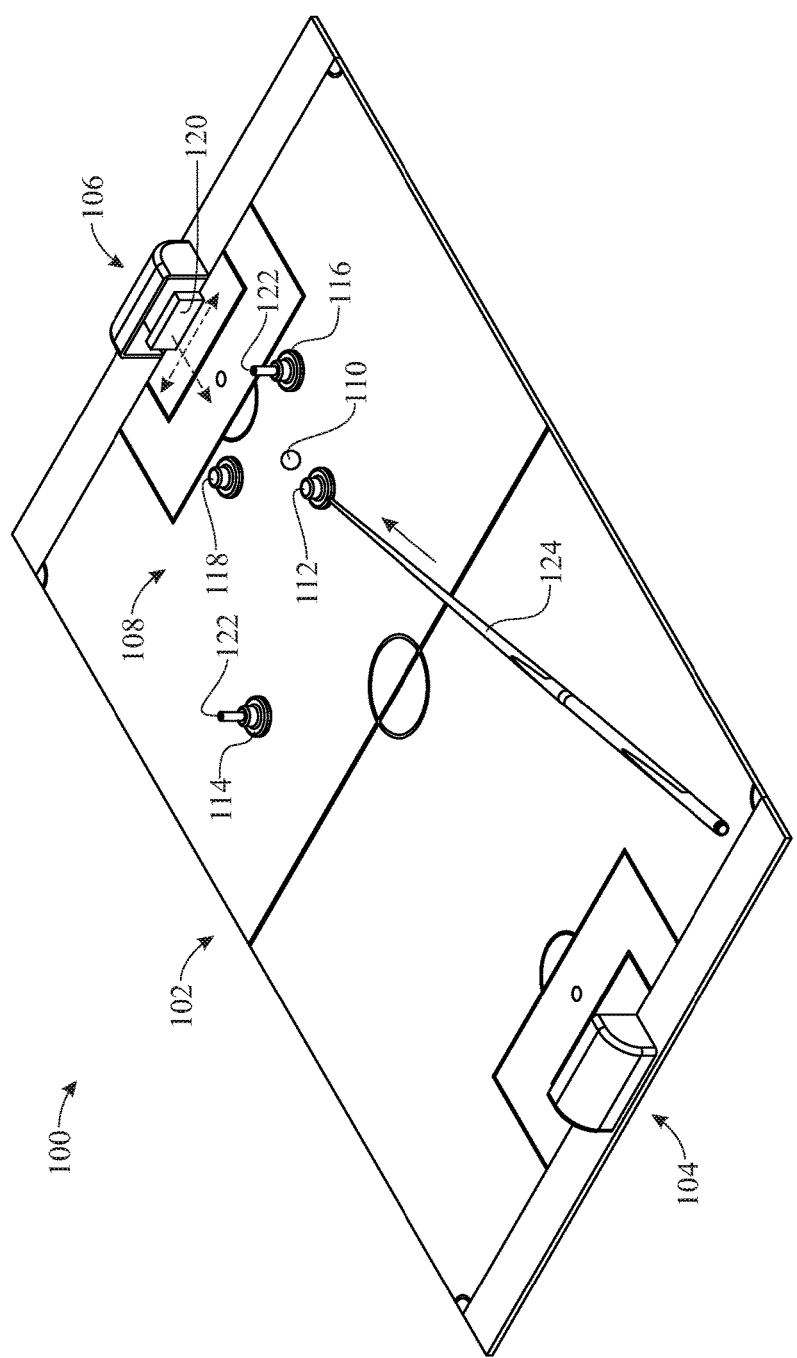
FIG. 2 presents a top perspective view of the cue sport soccer game at a second gameplay instance, in accordance with aspects of the present invention.
Figure 3:
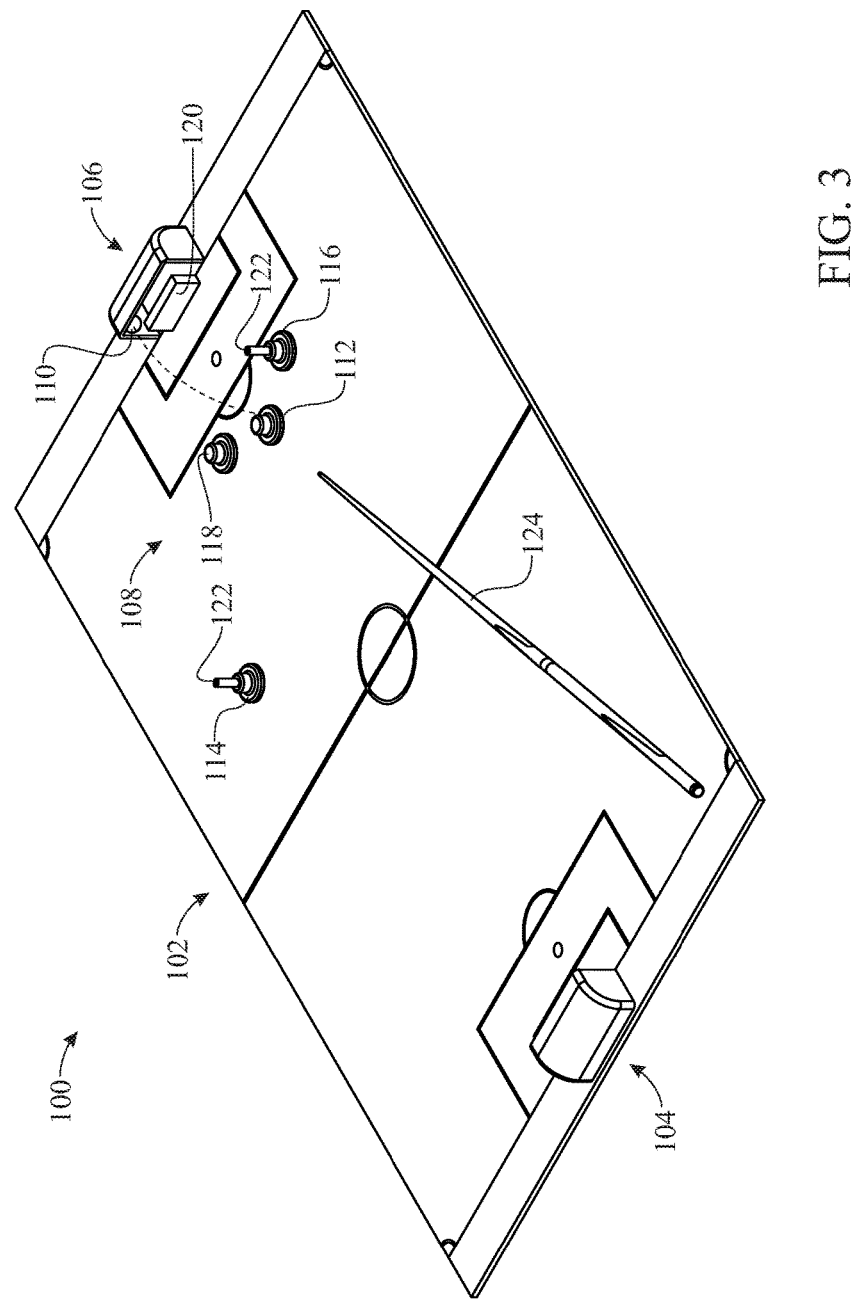
FIG. 3 presents a top perspective view of the cue sport soccer game at a third gameplay instance, showing scoring a goal, in accordance with aspects of the present invention.
Figure 4:
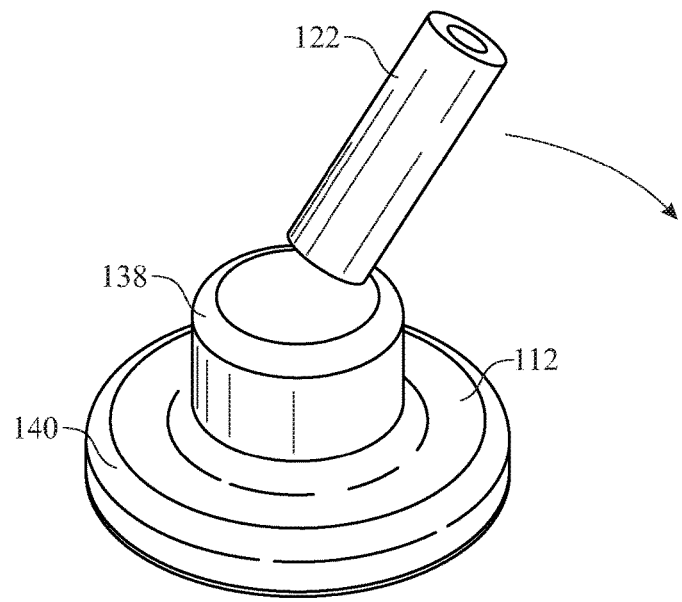
FIG. 4 presents a top perspective view of a field piece and an indicator object on top of the field piece, in accordance with aspects of the present invention.

The field pieces may be configured or manufactured to have a two-tier structure for appropriately trajecting the ball 110. For example, the ball 110 may be resting on the playing surface 102 before being trajected. When a field piece (that is also resting on the playing surface) is struck by a front tip of the cue stick 124, the field piece may subsequently strike or collide with the ball 110 and cause the ball to be strategically trajected for shooting (i.e. taking a shot), scoring a goal, passing, "dribbling" etc. FIGS. 2 and 3 show an example sequence of a player "taking a shot", with an arrow alongside the cue stick 124 of FIG. 2 showing a direction of motion of the cue stick 124 and a dashed line in FIG. 3 showing an example trajectory of the ball 110 towards the second goal 106 in response to a player taking a shot. In FIG. 2 the first field piece 112 is struck without slowly "pushing" or "dragging" the piece, and instead the collision between the cue stick 124 and the first field piece 112 causes the first field piece 112 to propel away from a tip of the cue stick 124 after being struck. This striking motion is similar to billiards, where a cue ball is not allowed to contact the tip of the cue stick for a prolonged time, and the contact or impact must be immediate or short (e.g. force applied for a short amount of time). Turning to FIG. 4, first field piece 112 includes a first tier 140 (i.e. lower or bottom tier) and a second tier 138 (i.e. upper or top tier). The field pieces and/or the ball 110 may be configured such that, in response to a lighter impact (i.e. with lesser collisive forces, or less kinetic energy transfer between a field piece and the ball 110), the ball 110 may stay grounded by merely contacting the first tier 140 (the ball subsequently having a trajectory similar to a "putt" in golf). Further, the field pieces and/or the ball 110 may be configured such that, in response to a heavier impact (i.e. greater collisive forces, or greater kinetic energy transfer between a field piece and the ball 110), the ball 110 may be initially propped up immediately after contacting the first tier 140 (e.g. rolling over the first tier 140), subsequently hitting or impacting the second tier 138, and being propelled or trajected forward in an elevated fashion (elevatably trajected or propelled). For example, after hitting the first tier 140 or second tier 138, the ball may have a vertical velocity component, or may be displaced in an elevated fashion. The configurations and selected weights and materials of the playing surface 102 and/or the playing pieces 108 may determine a particular threshold kinetic energy transfer that governs or determines whether the ball 110 is trajected in a grounded fashion or in an elevated fashion.

The first and second tiers may be cylindrically shaped, each having a thickness (e.g. height) and a diameter (e.g. width). The second tier 138 may be disposed on top of the first tier, and the first tier 140 may contact or be disposed near the playing surface for sliding. For example, the first tier 140 may have a first tier thickness of approximately quarter of an inch (0.635 cm). The first tier may have a first tier diameter of approximately two and five sixteenths of an inch (5.87 cm). The second tier 138 may have a second tier thickness of approximately thirteen sixteenths of an inch (0.475 cm). The second tier 138 may have a second tier diameter of approximately one and nine sixteenths of an inch (3.96 cm). The second tier 138 may be disposed or attached on top of the first tier 140, giving the field pieces a height of one and one sixteenth of an inch (2.69 cm). However, the thickness and diameter of the first or second tiers may vary without departing from scope of this disclosure. For example, these dimensions may vary by a few inches, an inch, or increments thereof. In general, the first tier 140 has a greater diameter than the second tier 138, and the second tier 138 has a greater thickness than the first tier 140. For example, the first tier 140 may have a diameter approximately one inch greater than the diameter of the second tier 138. The second tier 138 may have a thickness approximately one inch greater than the thickness of the first tier 140. The first tier 140 and the second tier 138 may be integrally formed, or may be removably or fixedly attached to one another. The first tier 140 or the second tier 138 may not necessarily be in the shape of a cylinder, and may be shaped to provide a desired ball trajectory, such as by having concave portions or surfaces.

Figure 5:
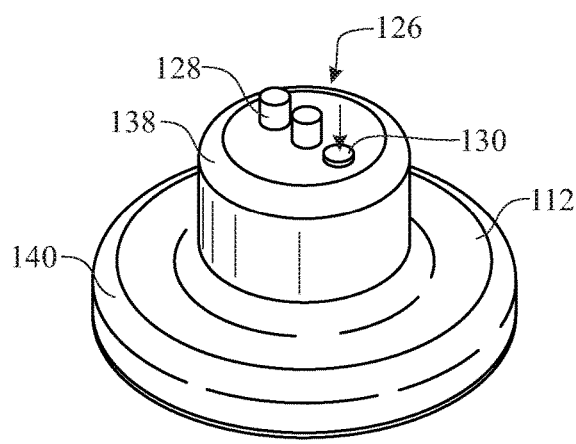
FIG. 5 presents a top perspective view of a field piece including a move indicator, in accordance with aspects of the present invention.

The field pieces are configured to be struck by a cue stick, struck either at the first tier 140 or the second tier 138 to cause the field pieces to slide or glide across the playing surface 102, similar to how a billiards player strikes a cue ball. However, the field pieces are not spherical, and are not configured to roll like a ball, and are more so configured to slide like a hockey puck. The field pieces are placed with a bottom surface of first tier 140 contacting or touching playing surface 102 before being struck for strategic sliding or gliding. For example, the field pieces may be configured to have a low center of gravity such that the field pieces do not topple, wobble, or flip over when struck by the tip of cue stick 124, and/or configured such that the field pieces smoothly and un-turbulently traject or traverse the playing surface. For example, in some embodiments, weights may be included inside the field pieces to provide an appropriate center of gravity. In some embodiments, the field pieces may be solid or in other embodiments somewhat hollow. In some embodiments, the field pieces may be single-tier. The first or second tiers may have rounded or angled edges as shown in FIGS. 4 and 5. The rounded or angled edges may provide better aerodynamics or aesthetics. The field pieces may be composed of or may include materials such as wood, plastic, rubber, or metal, or the like, and may be configured to appropriately glide or slide across the playing surface 102. For example, the field pieces may be composed of wood, and painted to achieve a desired sliding effect. For example, in some embodiments, the playing surface 102 may include a hard surface of plastic, metal or wood, and/or one or more of the playing pieces 108 may include rollers (e.g. free rolling balls or ball-bearings) on an underside of the first tier 140 to cause the field pieces to roll across the playing surface 102. In embodiments that include such rollers, the rollers are configured to simulate a particular appropriate coefficient of static or kinetic friction with respect to sliding field pieces. In some embodiments, the playing surface 102 and/or the playing pieces 108 may include magnetic components to provide, simulate, add, apply or assist an appropriate amount of magnetic and/or dry friction or drag to achieve an appropriate gameplay effect or condition. In some embodiments, the playing surface 102 includes ice or forced air holes (e.g. similar to air hockey) to provide an appropriate friction. The playing pieces may be configured to have a particular weight or mass, and their weights may be synergistically selected to interact appropriately with the playing surface 102 according to desired coefficient(s) of friction as described herein. In some embodiments, a layer of felt or fabric is disposed below the first tier 140 to provide appropriate gliding or sliding dynamics. Such a layer of felt may be removably attached, for example. As such, the first tier 140 may include at its bottom a flat surface that may be placed on the playing surface 102 such that the bottom of the first tier 140 is co-planar with the playing surface 102 for sliding. The second tier 138 may include a dip or slot to receive the indicator object 122, as further described below.

In some embodiments, the field pieces may include accelerometers or force sensing devices or sensors to determine gameplay conditions such as fouls, improper striking or improper moves (e.g. a push shot as known in billiards). Further, such force sensors may be configured to determine if a piece has been moved, or to keep track of a number of moves. For example, such force sensors may output a signal to a display that displays a number of moves available, or a number of moves used. Such gameplay mechanics regarding moves are described in more detail below.

Figure 6:
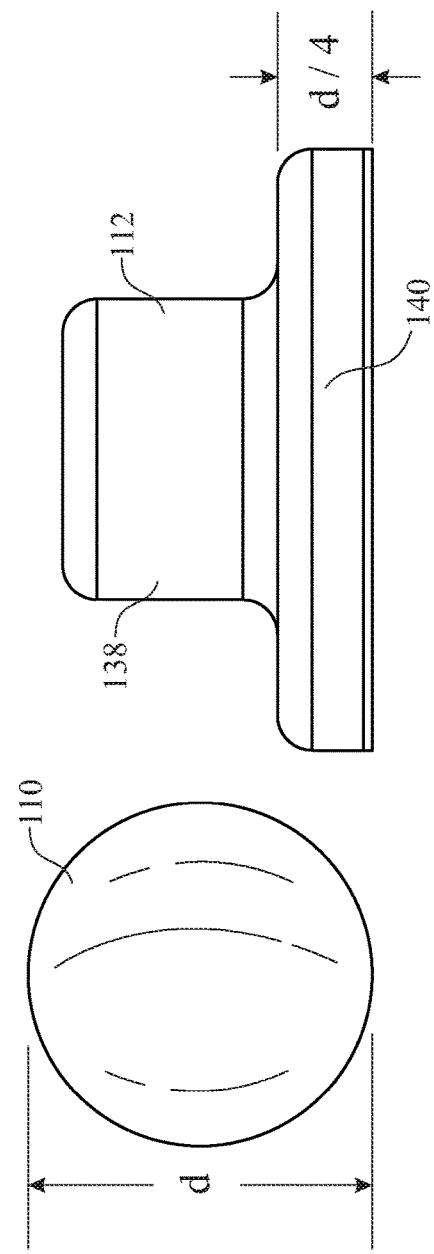
FIG. 6 presents a side elevation view of a field piece and a ball, in accordance with aspects of the present disclosure.

Next, the ball 110 will be further described. The ball 110 may include materials found in typical pom-pom balls, such as wool, cotton, paper, plastic, feathers etc. For example, the ball 110 may be or may resemble a crushed pom-pom ball having an approximate diameter of one and one half inches (3.81 cm), or one inch (2.54 cm). As shown in FIG. 6, the ball 110 may have a circumference "d" that is four times the thickness of the first tier 140. FIG. 6 shows the ball having a circumference (or height) "d" and the first tier 140 having a thickness (or height) of "d/4". For example, the ball 110 may be configured to have a weight and physical characteristics of a typical crushed pom-pom ball. The ball 110 may be configured to be trajected as described above, and may be synergistically configured along with the field pieces and/or the playing surface to provide an appropriate trajectory or friction upon being subjected to a light or heavy impact.

Next, the goalies will be further described. The goalies may take form as a solid block (i.e. rectangular, square, or parallelepiped, triangular or pyramidal) including materials such as wood, plastic, rubber, metal or the like. A goalie may have a height of approximately 2 inches (5.08 cm), and a length of approximately 4 and one quarter inches (10.8 cm), for example. A goalie may have any appropriate height, length or thickness. For example, a goalie may have a thickness (depth) of approximately one inch (2.54 cm). A face surface of a goalie is herein described as a "goalie face", and may be a side with a largest surface area, which is configured to partially block the goals. As such, the face surface area may be less than an opening of a goal, such as second goal 106 (as shown in FIG. 2). The goalie may be placed on the playing surface 102 such that the face surface faces an opposing goal (for example, the face surface of second goalie 120 faces first goal 104), and such that an adjacent bottom surface (along a length of the goalie) is placed on the playing surface 102 for keeping the goalie in an upright fashion with the face surface facing as described. The goalies may include various goal tending apparatuses such as sticks or handles to provide a hand grip for a player in embodiments where goaltending is allowed (e.g. a player having control of their goalie during a shot on goal). Further, the goalies may be configured to have a particular center of gravity, and/or may include various friction inducing elements such as hook and loop fasteners to keep the goalies in place (e.g. in instances where a field piece collides with a goalie). In some embodiments, the goalie may have one or more concave or convex surfaces, or may be oval or spherical in shape. In other embodiments, the goalie may take form as a soccer figurine, for example, or may be supported on a stand resembling legs. For example, a ball may be shot between such a soccer figurine's legs to score a goal. In some embodiments, the goalies may include the elements and configurations described herein with respect to the field pieces, and may be subjected to the same rules or movement allowances.

The goals (e.g. first goal 104 and second goal 106) may include ball catching structure such as a net or mesh to catch the ball 110 entering the goals, and may be configured to have a goal opening defined by poles or crossbars. The goal opening may have a height of approximately three and a half inches (8.89 cm) and a width of approximately seven inches (17.78 cm). However the dimensions of the goal opening may take any appropriate value. For example, the dimensions of the goal opening may be larger than a face surface of a goalie. In some embodiments, a rigid structure including metal, plastic, rubber, or wood may be included to catch balls entering the goals (via a shot for example). The cross bars that define the goal opening may include two parallel vertical bars, and one horizontal elevated bar supported by and connected to both parallel bars at elevated ends of the parallel vertical bars. The horizontal bar, the two vertical bars, and the playing surface ?? connect to one another to define the goal opening, and the goal opening may be rectangular, square, or any appropriate shape. Each goal may be placed at a respective goal line or on opposing ends of the playing surface. The goals may be placed such that their respective openings are facing each other.

The cue stick 124 may be a standard billiards cue, or any appropriate cue configured to strike the field pieces as described above. For example, in some embodiments, the cue stick 124 may include a rubber striking tip to more effectively apply spin or english to the field pieces, or to produce less noise upon striking the field pieces. However, it is to be understood that sidespin or english may be administered via standard billiards cue sticks.

The indicator object 122 shown in FIGS. 2-4 is configured to sit or rest on top of a field piece, such as first field piece 112 as in FIG. 4. The indicator object 122 may be a tubular and/or cylindrical structure or pillar, such as a pipe, and may be composed of plastic, rubber, metal, wood or combinations thereof. The indicator object may serve to indicate that a particular field piece has no more moves (as further described below with respect to the rules of the cue sport soccer game 100). The indicator object 122 may also serve as a foul indicator in instances where the indicator object 122 is knocked off a field piece. For example, in FIG. 4, the indicator object 122 is falling off the first field piece 112. It is to be understood that the shape of the indicator object 122 is not limited to being a pillar or a tube, and may take any appropriate shape such as parallelepiped, pyramidal, or spherical. Further, the second tier 138 may include a dip, depression, or slot to receive and hold the indicator object 122. The indicator object 122 and/or the playing pieces 108 or the field pieces may be configured to grab, hold, or attach the indicator object with an appropriate force for determining a foul. For example, hook and loop fasteners or magnetic components may be included in the field pieces or the indicator object 122 to apply an appropriate holding force.

The illustration of FIG. 5 shows an embodiment of the first field piece 112 including a move indicator 126. The move indicator 126 includes one or a plurality of push buttons, which may be operated between various positions. For example, in FIG. 5, a pressed push button 130 may indicate that the first field piece 112 has used one move, or alternatively that the first field piece has only one move left. As another example, an unpressed push button 128 may indicate that a move is available. The move indicator 126 may include one or more buttons or switches, for example, that are selectively switchable between a plurality of positions to indicate a number of moves available to a field piece or a number of moves used. In some embodiments, a die or dice may be used to indicate a number of moves used or available, and/or such die or dice may also be concurrently used similarly to the indicator object 122 for determining a foul.

The gameplay methods will now be further described. The playing pieces (excluding the ball) may be split into two teams. Each team may take turns moving their respective field positions. In each team's turn, a team may move one or more of their respective field pieces as described below, before it is an opposing team's turn. It is to be understood that a "turn" described herein is a gameplay stage where a particular team is allowed or required to make moves via the field pieces.

Referring to FIG. 1, a first team may include first field piece 112 and second field piece 114, A second team may include third field piece 116 and fourth field piece 118, The first team may include the first goalie (not shown), and the second team may include second goalie 120. In general, the first team protects first goal 104 while trying to score a goal in the second goal 106, and the second team protects the second goal 106 while trying to score a goal in the first goal 104. It is to be understood that any number, such as three, four or more field pieces may be included in each team without departing from scope of this disclosure. The teams may have an appearance to distinguish each team, such as by having different colors or patterns. For example, the teams may have colors representing soccer teams such as F.C. Barcelona of Real Madrid, or solid colors such as blue or red. Team indicating features may be removably attached to field pieces of playing pieces. For example, such team indicating features may be attached via stickers or elastic bands. In some instances, the field pieces of each team are identical to each other to provide a fair game. However, some players may desire a dynamic game where various different types or different configurations of field pieces may be included in a given game to represent a dynamic nature of soccer, where players and teams have strengths and weaknesses.

For purposes of description, referring to FIGS. 1-3, the first team (including first field piece 112 and second field piece 114) is initially considered "offense" or an "offensive team" and the second team (including third field piece 116 and fourth field piece 118) is considered "defense" or a "defensive team". Each field piece has as set number of available moves, such as one, two, three or more moves, A move is defined as a player striking a field piece, or subsequent motion or positioning (however exclusions exist as described below). However, in some alternative embodiments, a move is defined or determined when a field piece touches the ball 110 (for an offensive team, for example).

At the start of a game or round, the offense trajects (or launches or propels) the ball 110 towards or into the defense's half of the field (simulating a goal-kick), however this move may not count towards a field piece's available moves. However, in some embodiments, this move will count or consume one or more of a field piece's available moves. It is to be understood that a team in such an offensive state or position (the team starting with a goal-kick) may be described herein as having "offensive possession". If the ball does not reach the defensive team's half after a goal-kick, the game may include re-trajecting the ball (repeating the goal kick), swapping offensive possession, or continuing the game as described herein. Switching or turning offensive possession is defined herein such that previously defined defensive team becomes an offensive team, and the previously defined offensive team becomes a defensive team. After switching or swapping offensive possession, the game continues accordingly with the newly denoted offensive team attempting to score a goal as described herein. For example, after switching offensive possession, the first team becomes the offensive team, and the second team becomes the defensive team.

After the ball is launched into a defensive team's zone or half, it is then the defensive team's turn to make "blocking" moves to attempt to slide a field piece to a position that blocks a potential shot on goal. For example, each piece may have three "blocking" moves. A blocking move may be a blocking shot from a point on a side line, for example. A defensive field piece may re-take or restart a blocking move or shot if the defensive team's player is not happy with a resulting position of a blocking move. For example, a defensive field piece may have three chances to produce a desired blocking shot for keeping. After a third try, or after a player is happy with the defensive field piece's resulting blocking shot position, the indicator object 122 may be required to be placed on the respective field piece to indicate that the piece has no more moves left. A defensive team may not be required to make such a blocking move in a particular turn if the team does not wish to do so, and may save a field piece's blocking shot for a later turn in the game (e.g. after an offensive team's turn or move). In some embodiments, after a first defensive piece finishes its available moves, or decides their blocking shot(s) is/are adequate, the game may transfer to an opposing offensive team's turn for making a move. In some embodiments, both defensive field pieces must complete their available moves before the game transfers to an opposing offensive team's turn to make a move.

After the defensive team has placed their desired "blocking shots", it is then the offensive team's turn. The offensive team may have three moves (e.g. for each field piece, or for the whole team in general) to position offensive team field pieces before shooting. After three or an available predetermined number of positioning moves, a field piece may be required to take a shot on goal, or pass the ball to another field piece if the other field piece has an available move. A field piece may attempt to take a shot on goal at any time during a respective team's turn. In any given offensive team's turn, any desired number of field pieces may be moved. For example, an offensive team's player may desire to only move one field piece two moves, saving one move (and indicating an available number of moves via the move indicator 126 for example). Then, the offensive team may move another piece a desired number of moves, without the defensive team making a move. As such, field pieces in an offensive team may use available moves in any order, and may alternate between different pieces using moves. In some cases, a defensive team may "call out" that the defensive team is to make a blocking move mid-turn of an offensive team's turn.

In some embodiments, moving field pieces is only allowed in an alternating fashion, alternating between offensive team field pieces and defensive team field pieces. For example, after an offensive team moves an offensive team's field piece to a desired location, or takes a shot, the defensive team then is required to move a defensive team's field piece to a desired location. Similarly, after a defensive team has completed moves for a defensive field piece, the offensive team may then be required to move an offensive team's field piece. In such alternating fashion, a number of moves for each piece may be kept track of via the move indicator 126, for example.

As described above, after all moves have been extinguished, expired, or used, the indicator object 122 may be placed on a field piece to indicate the piece having no more moves left. Such a field piece with no more moves may be referred to herein as a temporarily expired or extinguished piece, for example, and such a piece is on standby until offensive possession has been turned, or until it is an opposing team's turn to move field pieces, or until a new game or round starts. For example, a temporarily expired piece may be on standby until one or more of an opposing team's available moves are used. In some cases, a team may choose to place the indicator object 122 on a field piece to protect the field piece from a foul, and as such may choose to place the indicator object 122 even if moves are available (however in this case the player relinquishes available moves). If all field pieces have used all moves, then offensive possession may be turned over. In some embodiments, offensive possession turns to an opposing team after a certain number of moves, or a certain number of a team's turns. Further, if a goal is scored, offensive possession may be turned over. In some embodiments, a field piece causing a foul may lose one or more available moves, or a foul may cause offensive possession to be turned to an opposing team.

It is to be understood that the cue sport soccer game 100 may include variations to the above gameplay rules or elements. For example, an offensive field piece may take a shot on goal at any point, or in other alternative embodiments, an offensive field piece may only shoot when all other offensive team field pieces have used all moves, or have become temporarily expired on standby. In some embodiments, after a shot on goal, the ball 110 may rebound back into a defensive team's zone or half in a rebound instance. In such a rebound instance, offensive possession may be turned over or switched, and the round or game may continue as such. For example, with respect to FIG. 3, if the ball 110 rebounds off the second goal 106 or second goalie 120 and enters the first team's half (currently offensive), the offensive possession may turn over to the second team (currently defensive).

Out of bounds and field line (side line or end line) rules may apply to the cue sport soccer game 100. For example, if the ball 110 is struck to go out of bounds at the end line (goal line) a goal kick (or the offensive possession is turned over or switched) may be applied. Likewise if the ball 110 is struck to go out of bounds at the side lines (touch lines) a throw-in may be simulated. Similarly, penalty and foul rules may apply. For example, in response to a foul, offensive possession may be turned over to a defensive team, or in instances where a foul occurs in a penalty box, a penalty shot may be allowed or granted to the team or field piece subjected to the foul.

In a physical form, the playing surface 102 is configured for presenting and playing the cue sport soccer game 100. For example, in physical form one or more of the above described elements may be provided in a physical kit, Such a physical kit may include playing surface 102, the playing pieces 108 and goals in such a kit, instructions reflecting some or more of the above described gameplay methods or mechanics may be included.

In virtual computer implemented form or embodiments, the cue sport soccer game 100 may be presented via a computer display via computer graphics. For example, in virtual embodiments, such as computer implemented embodiments, the playing surface 102, and the playing pieces or any element described above may be displayed via computer graphics or a graphical user interface on a display screen or computer monitor, and the playing surface" may be a virtual surface for playing the cue sport soccer game 100. For example, in such a virtual form, a physics engine may be included to simulate the various elements and mechanics described above. For example, coefficients of friction, gravity, collisive forces and air resistance may be virtually modeled and resulting gameplay may be provided to users. For example, in virtual embodiments the cue sport soccer game 100 may be provided to a plurality of users for multiplayer internee network gaming or hot seat gaming. Various elements described above may be provided via virtual indicators relating to the above elements, such as a number of moves left for each piece, score, line-up, yellow or red cards (for fouls), or substitutions may be provided via a heads-up display (HUD) or various in-game text it is anticipated that augmented reality games will be available in the future, and the disclosed invention is not to be excluded from augmented reality gaming implementations. For example, the various playing pieces may be virtual or virtually projected augmentations of a real billiards board, which may be provided to a user via a head mounted display (HMD).

For example, methods or elements described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

In conclusion, disclosed is a cue sport soccer game for playing a novel soccer game on a playing surface with playing pieces. More particularly, the playing pieces include field pieces that are configured for sliding on the playing surface strategically, and configured to be struck strategically lightly or heavily to cause a game ball to be trajected in a grounded fashion or an elevated fashion respectively.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A cue sport soccer game, comprising:
a playing surface;
two goals placed at opposite ends of the playing surface;
a ball;
a plurality of field pieces, the plurality of field pieces configured to be struck by a cue stick to slide the plurality of field pieces on the playing surface to impact the ball, wherein each of the plurality of field pieces comprises a two-tiered structure and a foul indicator object, the foul indicator object being placed on the two-tiered structure and configured to indicate a foul when the foul indicator object falls off the two-tiered structure;
wherein a first field piece of the plurality of field pieces is part of an offensive team, the first field piece including a first move indicator, the first move indicator including a plurality of push buttons to indicate a number of offensive positioning moves for the first field piece during the possession of the ball;
wherein a second field piece of the plurality of field pieces is part of a defensive team, the second field piece including a second move indicator, the second move indicator including a plurality of push buttons to indicate a number of defensive positioning moves for the second field piece during possession of the ball.

2. The cue sport soccer game of claim 1, wherein the two-tiered structure of the plurality of field pieces have a first and second tier that each have different diameters, where the first tier and the second tier are cylindrical in shape.

3. The cue sport soccer game of claim 1, wherein the two-tiered structure of the plurality of field pieces have a first and second tier that each have different thicknesses, where the first tier and the second tier are cylindrical in shape.

4. The cue sport soccer game of claim 1, wherein the plurality of field pieces are configured to traject the ball in a grounded or elevated fashion in response to a light or heavy impact, respectively.

5. The cue sport soccer game of claim 1, wherein the two-tiered structure of the plurality of field pieces have the two tier structure including a first tier and a second tier, where the first tier has a greater diameter than the second tier and the second tier has a greater thickness than the first tier, where the first tier and the second tier are cylindrical in shape, and where the first tier and the ball are both dimensioned relative to one another to elevate the ball due to the first tier impacting the ball.

6. A method for playing a cue sport soccer game on a playing surface, the method comprising:
   providing the cue sport soccer game on the playing surface, two goals placed at opposite ends of the playing surface; a ball;
   a plurality of field pieces, the plurality of field pieces configured to be struck by a cue stick to slide the plurality of field pieces on the playing surface to impact the ball, wherein each of the plurality of field pieces comprises a two-tiered structure and a foul indicator object, the foul indicator object being placed on the two-tiered structure and configured to indicate a foul when the foul indicator object falls off the two-tiered structure;
   splitting the plurality of field pieces into two teams comprising a first field piece of an offensive team and a second field piece of a defensive team;
   placing the plurality of field pieces such that the two teams are arranged on opposite sides of the playing surface;
   wherein the plurality of field pieces includes a first move indicator of a first field piece of the offensive team and a second move indicator of the second field piece of the defensive team;
   providing for a possession of the ball;
   setting a first move indicator of the first field piece of the offensive team to indicate a number of offensive positioning moves for the first field piece in the possession of the ball of the offensive team;
   striking the field piece of the offensive team by a first cue stick to subsequently traject the ball to the opposite side of the playing surface;
   update the first move indicator of the first field piece of the offensive team by pushing the plurality of buttons to indicate a number of positioning moves available or a number of positioning moves used in the possession;
   setting the second move indicator of the second field piece of the defensive team to indicate a number of defensive positioning moves for the second field piece for the possession of the ball of the offensive team;
   striking a defense field piece with a second cue stick to subsequently traject the defensive field piece to block the offense team from scoring a goal with the ball;
   updating the second move indicator of the second field piece of the defensive team by pushing the plurality of buttons to indicate a number of positioning moves available or a number of positioning moves used in the possession;
   determining a foul when the foul indicator object falls off one of the plurality of field pieces;
   ending the possession of the ball when the move indicators of the plurality of field pieces indicate that no moves are available or all moves have been used.

7. The method of claim 6, wherein the playing surface is configured to fit on a billiards table.

8. A method for playing a cue sport soccer game on a playing surface, the method comprising:
   providing the cue sport soccer game on the playing surface, two goals placed at opposite ends of the playing surface;
   a ball;
   a plurality of field pieces, the plurality of field pieces configured to be struck by a cue stick to slide the plurality of field pieces on the playing surface to impact the ball, wherein each of the plurality of field pieces comprises a two-tiered structure and a foul indicator object, the foul indicator object being placed on the two-tiered structure and configured to indicate a foul when the foul indicator object falls off the two-tiered structure;
   splitting the plurality of field pieces into two teams comprising a first field piece of an offensive team and a second field piece of a defensive team;
   placing the plurality of field pieces such that the two teams are arranged on opposite sides of the playing surface;
   wherein the plurality of field pieces includes a first move indicator of a first field piece of the offensive team and a second move indicator of the second field piece of the defensive team;
   providing for a possession of the ball;
   setting the first move indicator of the first field piece of the offensive team to indicate a number of offensive positioning moves for the first field piece in the possession of the ball of the offensive team;
   striking the field piece of the offensive team by a first cue stick to subsequently traject the ball to a target goal of the playing surface;
   update the first move indicator of the first field piece of the offensive team by pushing the plurality of buttons to indicate a number of positioning moves available or a number of positioning moves used in the possession;
   setting the second move indicator of the second field piece of the defensive team to indicate a number of defensive positioning moves for the second field piece for the possession of the ball of the offensive team;
   striking a defense field piece with a second cue stick to subsequently traject the defensive field piece to block the offense team from scoring a goal with the ball;
   updating the second move indicator of the second field piece of the defensive team by pushing the plurality of buttons to indicate a number of positioning moves available or a number of positioning moves used in the possession;
   determining a foul when the foul indicator object falls off one of the plurality of field pieces;
   ending the possession of the ball when the move indicators of the plurality of field pieces indicate that no moves are available or all moves have been used.

9. The method of claim 8, wherein the playing surface is configured to fit on a billiards table.

10. The method of claim 8, wherein the two-tiered structure of the plurality of field pieces have a first and second tier that each have different diameters and thicknesses, where the first tier and the second tier are cylindrical in shape.

11. The method of claim 8, where the plurality of field pieces are configured to traject the ball in a grounded or elevated fashion in response to a light or heavy impact, respectively.

* * * * *